United States Patent
deNormand

(10) Patent No.: US 10,167,658 B2
(45) Date of Patent: Jan. 1, 2019

(54) SIDE-LOAD HUNG WINDOW ASSEMBLY WITH SASH GUIDES

(71) Applicant: Caldwell Manufacturing Company North America, LLC, Rochester, NY (US)

(72) Inventor: Richard S. deNormand, Victor, NY (US)

(73) Assignee: Caldwell Manufacturing Company North America, LLC, Rochester, NY (US)

(*) Notice: Subject to any disclaimer, the term of this patent is extended or adjusted under 35 U.S.C. 154(b) by 39 days.

(21) Appl. No.: 15/263,696

(22) Filed: Sep. 13, 2016

(65) Prior Publication Data

US 2017/0130498 A1    May 11, 2017

Related U.S. Application Data

(60) Provisional application No. 62/218,201, filed on Sep. 14, 2015.

(51) Int. Cl.

| | |
|---|---|
| *E05D 15/16* | (2006.01) |
| *E05D 13/00* | (2006.01) |
| *E05D 15/22* | (2006.01) |
| *F16F 1/10* | (2006.01) |
| *E05D 15/24* | (2006.01) |

(52) U.S. Cl.
CPC .......... *E05D 15/165* (2013.01); *E05D 13/10* (2013.01); *E05D 13/1253* (2013.01); *E05D 13/1276* (2013.01); *E05D 15/22* (2013.01); *E05D 15/244* (2013.01); *F16F 1/10* (2013.01); *E05Y 2900/148* (2013.01)

(58) Field of Classification Search
USPC ..................................................... 49/445, 446
See application file for complete search history.

(56) References Cited

U.S. PATENT DOCUMENTS

| 729,885 | A | * | 6/1903 | McSherry | ............... E06B 9/264 160/98 |
|---|---|---|---|---|---|
| 892,605 | A | * | 7/1908 | Merz | .......................... E06B 3/44 16/202 |
| 3,364,622 | A | * | 1/1968 | Collard | ................... E05D 13/04 16/197 |
| 3,676,956 | A | * | 7/1972 | Taylor | ....................... E06B 3/44 49/181 |
| 4,262,449 | A | * | 4/1981 | Riegelman | .............. E05D 13/12 49/404 |
| 4,400,026 | A | * | 8/1983 | Brown, Jr. | ................. E05C 1/10 292/152 |
| 5,119,592 | A | * | 6/1992 | Westfall | .............. E05D 13/1207 49/161 |

(Continued)

*Primary Examiner* — Marcus Menezes
(74) *Attorney, Agent, or Firm* — Harness, Dickey & Pierce, P.L.C.

(57) ABSTRACT

A side-load, hung window assembly can include a sash guide attached to the window sash and extending into a space between the window sash and the jamb channel. The sash guide can include a recess at an outer end to provide clearance for the sash guide to pass over the uncurled end portion of the curl spring and the mounting device. In addition, an aesthetic cover can be disposed over the mounting device. Alternatively or in addition, a spring cover can be disposed over the uncurled end portion of the curl spring and the mounting device.

18 Claims, 7 Drawing Sheets

(56) References Cited

U.S. PATENT DOCUMENTS

| | | | | |
|---|---|---|---|---|
| 5,414,962 A * | 5/1995 | Forbis | ............... | B29C 66/1142 49/414 |
| 6,990,710 B2 * | 1/2006 | Kunz | ............... | E05D 13/08 16/193 |
| 8,424,245 B1 * | 4/2013 | Kunz | ............... | E05D 15/22 49/183 |
| 2008/0034537 A1 * | 2/2008 | Tuller | ............... | E05D 13/08 16/197 |
| 2016/0245007 A1 * | 8/2016 | Kunz | ............... | E05D 15/165 |

* cited by examiner

SIDE-LOAD HUNG WINDOW ASSEMBLY WITH SASH GUIDES

CROSS-REFERENCE TO RELATED APPLICATIONS

This application claims the benefit of U.S. Provisional Application No. 62/218,201, filed on Sep. 14, 2015. The entire disclosure(s) of the above application is incorporated herein by reference.

FIELD

The present disclosure relates to hung windows having side-load window sashes, and more particularly to a sash guide for a side-load hung window assembly having a curl spring-type window balance assembly.

BACKGROUND

This section provides background information related to the present disclosure which is not necessarily prior art.

Modern window assemblies in residential, commercial and industrial buildings may include one or more window sashes that are movable within a window jamb of a window frame. Window sashes that move vertically to open and close often include two or more window balance assemblies. Window balances urge the window sash upward (i.e., toward an open position for a lower sash or toward a closed position for an upper sash) to assist a user in moving the window sash and to retain the window sash at a position selected by the user. A single-hung window features a stationary top sash and a bottom sash that slides vertically up and down. In addition, many single- and double-hung windows allow for the window sashes to be removed from the window frame for easy cleaning. A side-load window sash can be removed vertically from its associated window balances and be maneuvered horizontally within the jambs of the window frame to enable the window sash to be removed.

SUMMARY

This section provides a general summary of the disclosure, and is not a comprehensive disclosure of its full scope or all of its features.

In one aspect, the present disclosure provides a side-load, hung window assembly. The window assembly includes a window frame including a window jamb defining a jamb channel. A window sash is disposed in the window frame and includes a side rail. A window balance assembly is installed in the jamb channel and engages the window sash to support the window sash with a counterbalance force.

In another aspect of the disclosure, the side-load, hung window assembly can include a sash guide attached to the window sash and extending into a space between the window sash and the jamb channel. The sash guide can include a recess at an outer end to provide clearance for the sash guide to pass over the uncurled end portion of the curl spring and the mounting device. In addition, an aesthetic cover can be disposed over the mounting device. Alternatively or in addition, a spring tail cover can be disposed over the uncurled end portion of the curl spring and the mounting device.

In still further aspects of the disclosure, a sash guide assembly for a hung window having a window sash, a window jamb, and a window balance assembly is disclosed. The sash guide assembly can include a spacer having a cover portion with a horizontal upper wall. The horizontal upper wall can include a bottom surface that can be located in close proximity to and/or contact a top surface of an upper rail of the window sash when it is in an installed configuration. The spacer also can include a first vertical side wall and a second vertical sidewall, with each of the side walls extending generally perpendicularly from the horizontal upper wall and being substantially parallel to one another. A lower wall of the spacer can extend between the first and second vertical side walls. The spacer can also include a latch member extending from the bottom surface of the upper wall. The latch member can have a projection portion disposed at a lower end, and the projection portion can have a first and second ramped surfaces. A recess can be defined by the upper wall and inner surfaces of the first and second vertical side walls.

Further aspects of the disclosure include the sash guide also having a receiver. The receiver can have a base portion, an upper portion and a front wall extending between the base portion and the upper portion. The front wall can have an inner surface having a third ramped surface, a fourth ramped surface adjacent to the third ramped surface, and a fifth ramped surface adjacent to the fourth ramped surface. The fifth ramped surface can engage the second ramped surface of the spacer, and the fifth ramped surface can be substantially parallel to the second ramped surface in the installed configuration. Still further, the receiver can include a third and fourth substantially parallel vertical side walls that can extend between the base portion and the upper portion. A channel can be defined by the front wall and the vertical side walls. The receiver can also include an aperture in the front wall and a fastener that mount the receiver to a side rail of the window sash.

The sash guide assembly can be movable with the window sash with respect to the window jamb in the installed configuration, and the spacer can pass over an uncurled end portion of a curl spring of the window balance assembly.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
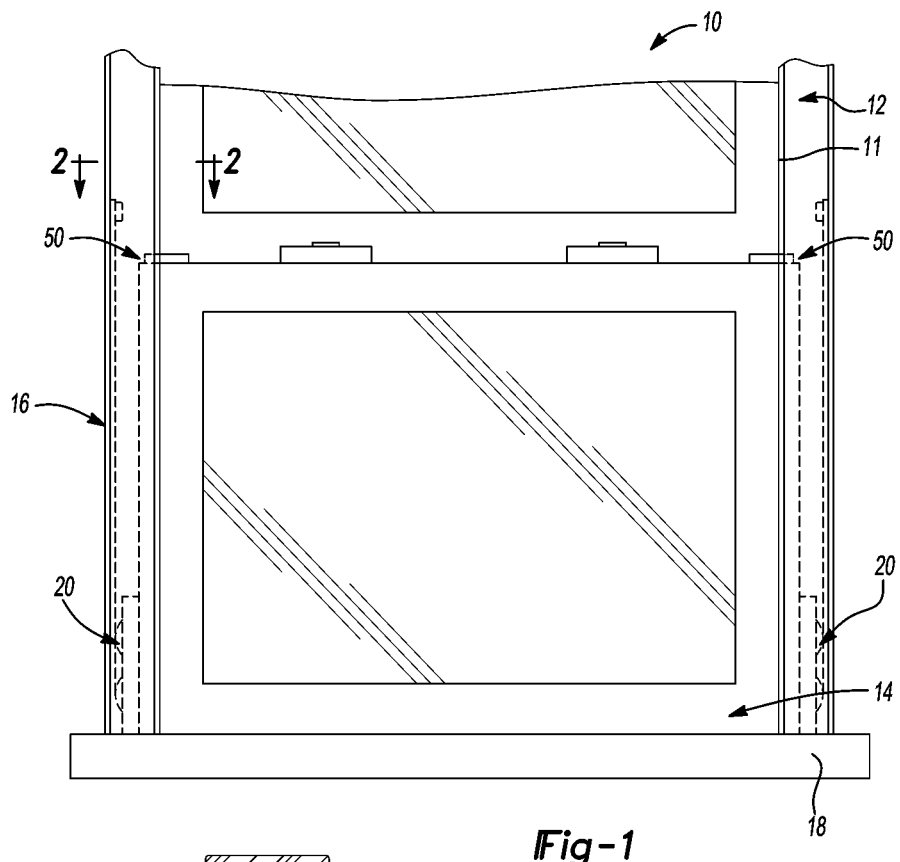
FIG. 1 is a partial front view of a side-load, hung window assembly including sash guides according to the principles of the present disclosure.

With reference to FIG. 1, a side-load, hung window assembly 10 is shown and can include a window frame 11 having a pair of opposing vertical window jambs 16, a horizontal window sill 18. An upper sash 12 and a lower sash 14 are disposed within the window frame 11. Two window balance assemblies 20 each engaging the lower sash and a respective window jamb 16, also comprise part of the window assembly 10. In the particular window assembly 10 illustrated in FIG. 1, the upper sash 12 is fixed relative to the window sill 18 (i.e., in a single hung window assembly) and the vertically moveable lower sash 14 is a side-load removable sash.

Figure 2:
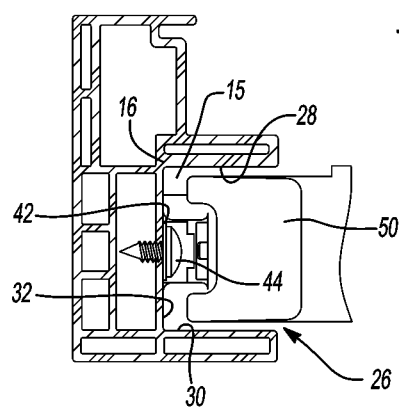
FIG. 2 shows a cross-sectional view along the line 2-2 of FIG. 1.

As best seen in FIG. 2, each window jamb 16 can define a jamb channel 26 including a first wall 28, a second wall 30 opposite the first wall 28, and a third wall 32 disposed perpendicularly to the first and second walls 28, 30. As is well-known, the upper and lower window sashes are generally rectangular-shaped and include opposing vertically-extending side rails (or stiles) and opposing horizontally-extending upper, or top, and lower, or bottom, rails. The upper and lower window sashes are disposed within the opposing jamb channels 26 of the window frame.

The lower sash 14 may be vertically raised and lowered between open and closed positions and may be connected to the window balance assemblies 20 which assist a user in opening the lower sash 14 and maintain the lower sash 14 in a desired position relative to the window sill 18. However, in some embodiments, the upper sash 12 may also be movable relative to the window sill 18 between a raised or closed position and a lowered or open position (i.e., in a double-hung window assembly). It will be appreciated that in a double hung window assembly, the upper sash 12 may also be connected to two or more window balance assemblies 20 to assist the user in opening the upper sash 12 and maintaining the upper sash 12 in a selected position relative to the window sill 18.

Figure 10:
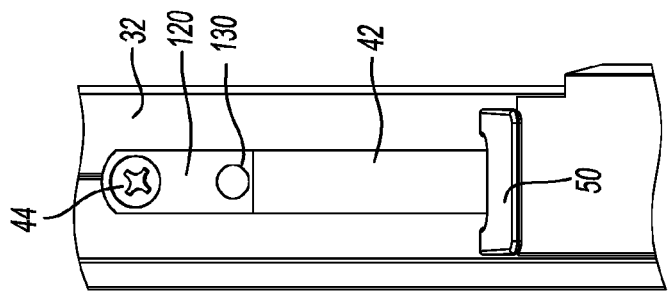
FIG. 10 illustrates an enlarged detailed view of the sash guide installed on a window sash according to the principles of the present disclosure.

The window balance assemblies 20 may be installed within the jamb channels 26. Each of the window balance assemblies 20 can be described as a side-load, constant force counterbalance and can include a carrier, one or more curl springs 42, and a mounting device, such as a threaded fastener or screw 44, as best shown in FIG. 10. The window balance assemblies 20 may be initially assembled and shipped in an uninstalled or shipping configuration and may be subsequently installed in the window assembly 10 and placed in an installed configuration by a window manufacturer, a construction or renovation contractor, or a homeowner, for example. The window balance assembly 20 can be non-handed and can be installed in either the right side jamb channel 26 or the left side jamb channel 26 of the window assembly 10.

The carrier can engage the lower sash 14 to support the sash 14 with a counterbalance force. A curled portion of the curl spring 42 can be housed in the carrier with an uncurled end portion or spring tail extending from the carrier on an outer side of the carrier that is opposite to the window sash 14. The mounting screw 44 can engage and fix the uncurled end portion of the curl spring 42 to a wall (e.g., third wall 32) of the jamb channel 26, as shown in FIG. 2. Thereafter, the carrier can bear the weight of the sash 14, and through the curl spring's 42 resistance to being uncurled, can exert an upward counterbalance force on the carrier and sash 14, thereby biasing the lower sash 14 toward the open position (e.g., against the force of gravity and any frictional forces between the sash and the jamb channel).

Figures 11A, 11B:
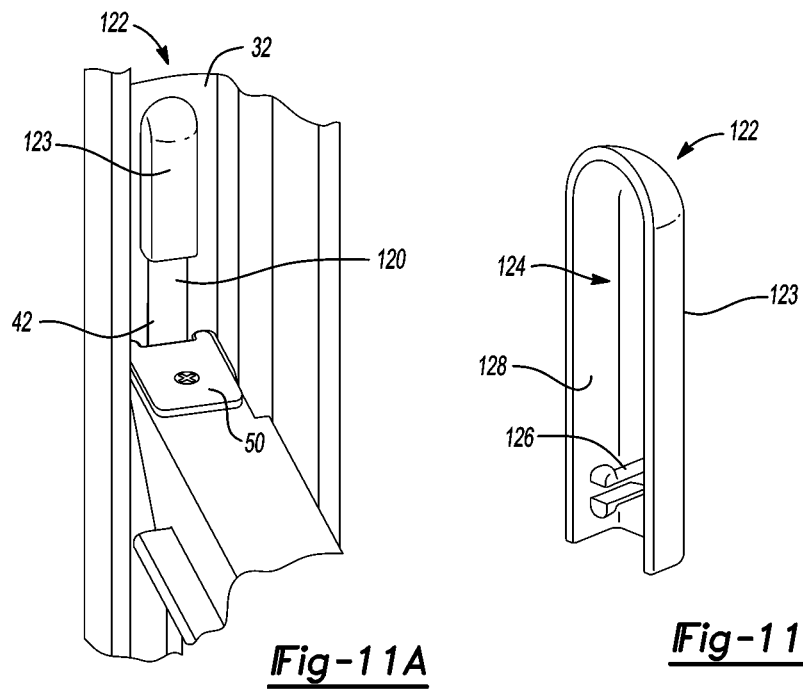
FIG. 11A is an upper portion of a closed window sash with the sash guide of FIG. 10 and including a spring tail cover according to the principles of the present disclosure.
FIG. 11B shows a detail view of the inner side of the spring tail cover of FIG. 11A.
Figure 11C:
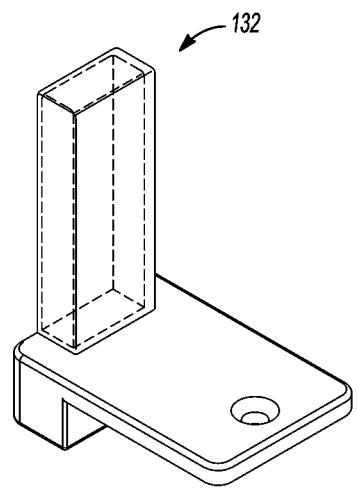
FIG. 11C shows an alternate spring tail cover similar to the spring tail cover of FIG. 11A.

As shown, e.g., in FIGS. 1-4 and 11A, the window assembly can include sash guides 50 installed on the window sash 14 according to the principles of the present disclosure. Each sash guide fills a horizontal gap 15 between a respective one of the vertical rails of the window sash 14 and the jamb channel 26 of the window assembly, as can be seen in FIG. 11. The sash guides improve the overall aesthetic and finished appearance of the side-load, hung window assembly.

With the sash guide installed, the side-load window sash cannot be removed from the window frame in the usual manner, and the sash guide generally must be removed from the horizontal gap 15 to enable the window sash to be removed from the window frame, e.g., for cleaning or service.

Referring to FIGS. 3, 4, 5 and 6, one embodiment of a sash guide according to the present disclosure is illustrated.

Figure 3:
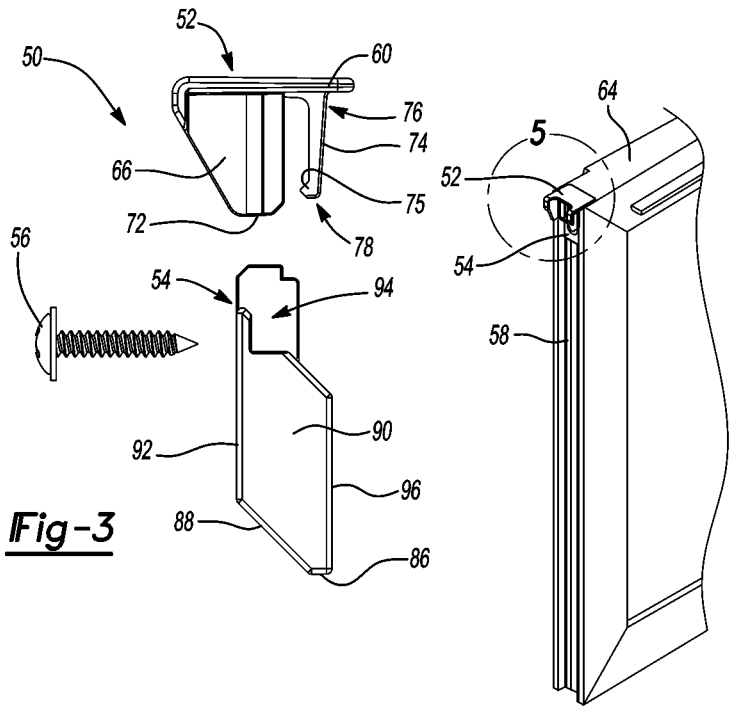
FIG. 3 is a side view showing the disassembled spacer and receiver components of a sash guide according to the principles of the present disclosure.
Figure 4:
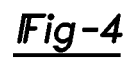
FIG. 4 is a partial perspective view of a window sash for a side-load, hung window assembly including a sash guide according to the principles of the present disclosure.
Figure 5:
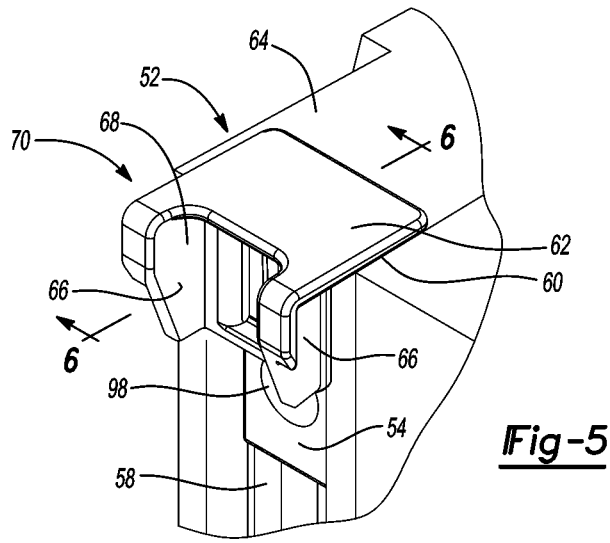
FIG. 5 is an enlarged detail view of a portion of FIG. 4.
Figure 6:
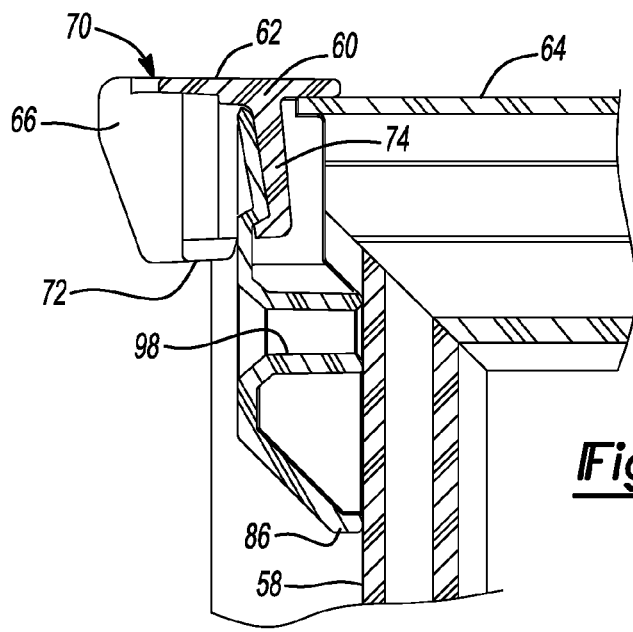
FIG. 6 is a partial cross-sectional view along the lines 6-6 of FIG. 5.
Figure 9A:
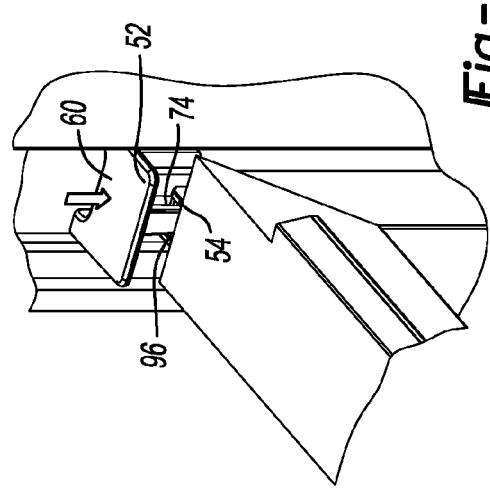
FIGS. 9A and 9B depict the installation and removal, respectively, of a spacer of the sash guide on a window sash according to the principles of the present disclosure.
Figure 9B:
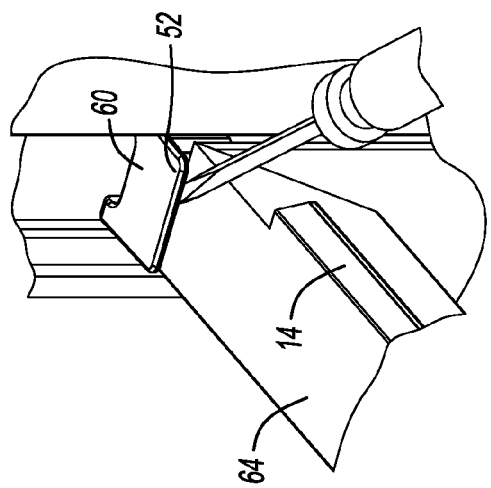

As shown in FIG. 3, the disassembled components of the sash guide assembly 50 generally include a spacer 52, a receiver 54 and a fastener 56. As seen in FIGS. 6, 9A and 9B, the sash guide receiver 54 can be mounted to a vertical side rail 58 of the window sash 14 by the fastener 56, prior to the sash being installed in the side-load hung window assembly. After the sash 14 is installed in the window assembly 10, the spacer 52 can be assembled with the receiver 54 such that the spacer 52 is in close proximity to an upper rail 64 of the window sash 14. As shown in FIGS. 5, 6 and 10, the spacer 52 further can be in direct contact with and/or engage the upper rail 64 of the window sash 14.

Figure 7A:
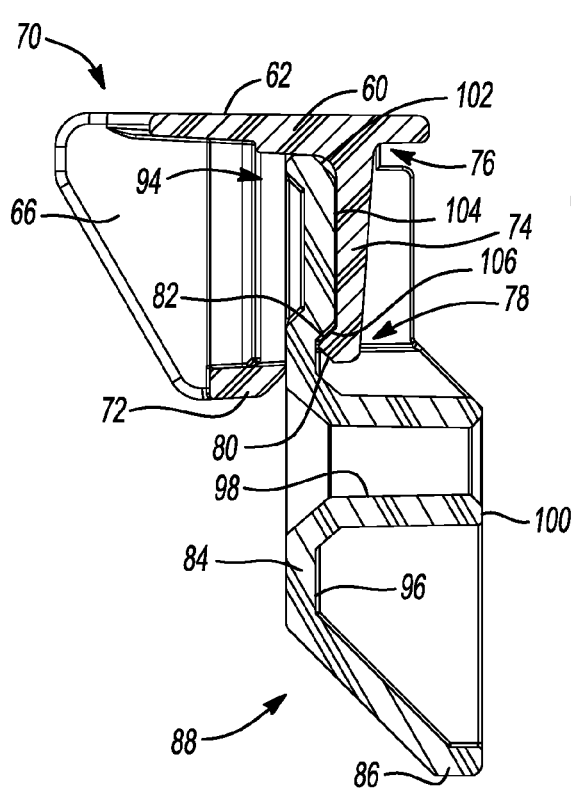
FIGS. 7A and 7B are cross-sectional views (taken in a manner similar to the cross-sectional view shown of FIG. 6) of exemplary sash guides according to the principles of the present disclosure.
Figure 7B:
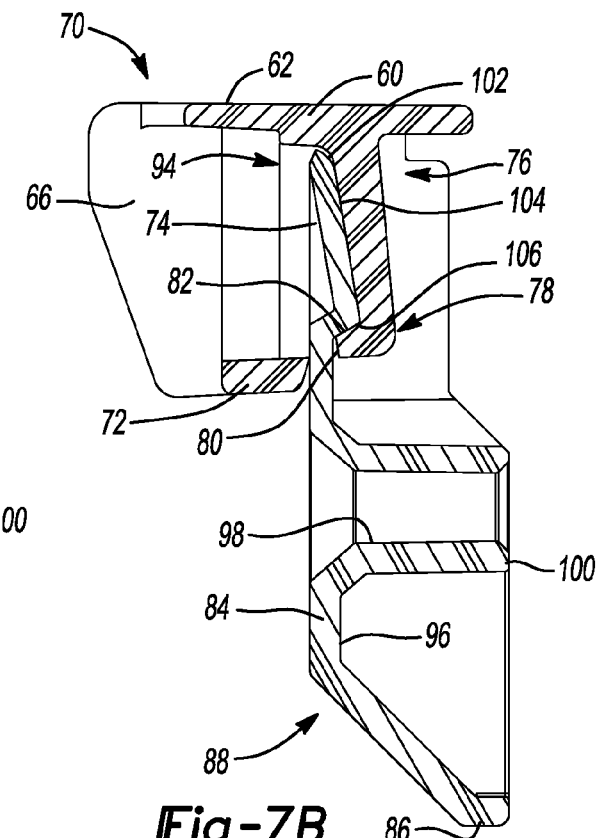

As seen in the figures, and particularly FIGS. 6, 7A and 7B, the spacer can generally include an upper wall or cover portion 60. The cover portion 60 can comprise a generally flat, horizontally-oriented, rectangular upper surface 62. When installed, the cover portion 60 can extend outward beyond the side rails 58 of the window sash. In addition, the cover portion 60 can overlay the upper rail 64 of the window sash 14 and can be matched in appearance to the window sash to provide a coordinated and aesthetically pleasing finished appearance to the window assembly.

The cover portion 60 can be flanked by two opposing, laterally spaced-apart side walls 66. The side walls 66 can extend vertically downward from the cover portion 60. The cover portion 60 and side walls 66 can together form an opening or recess 68 at an outer or outward end 70 (i.e., the side away from the vertical side rail 58 of the window sash) of the spacer. As can be appreciated, the recess 68 can allow the spacer 52 of the sash guide 50, installed on the window sash 14 of the window assembly, to avoid interfering with and bypass the uncurled end portion of the curl spring 42 as the window sash is moved vertically in the window frame. At a lower end of the spacer 52, a horizontal lower wall 72 can connect to both side walls 66.

In addition, located beneath the upper wall 60 and extending generally vertically downwardly therefrom, the spacer can also include a finger-like extension or latch member 74. As shown in FIGS. 7A and 7B, the latch member 74 can extend along a longitudinal axis that intersects the upper wall 60 approximately perpendicularly, e.g., about 90 degrees as shown in FIG. 7A, or at an acute angle of less than about 45 degrees, and preferably about 30 degrees with respect to a vertical axis, e.g., as shown in FIG. 7B. The latch member 74 can be cantilevered from the upper wall 60 at its proximal end 76 and can be resiliently flexible or bendable relative to the upper wall 60.

At its distal end 78, the latch member 74 can include a projection portion 75. The projection portion 75 can protrude outwardly, i.e., away from vertical side rail 58 of the window sash 14, and approximately laterally from the longitudinal axis and can include a lower, first ramped surface 80 having a first angle, and an upper, second ramped surface 82 having a second angle. As measured from a horizontal axis, the first angle and the second angle can be the same or different values. In one configuration, as shown in FIG. 7A, the first and second angles can have the same or approximately the same value and can be mirrored about the horizontal axis. In another configuration, as shown in FIG. 7B, the first and second angles can have different values, with the first angle of the first ramped surface 80 being greater than 45 degrees, and even close to 90 degrees, and the second angle of the second ramped surface 82 being less than 45 degrees.

As will be discussed further below, the latch member 74 of the sash guide 50 can be inserted into and engage a channel of the sash guide receiver 54 to firmly retain the sash guide 50 with the sash guide receiver 54.

Figure 8A:
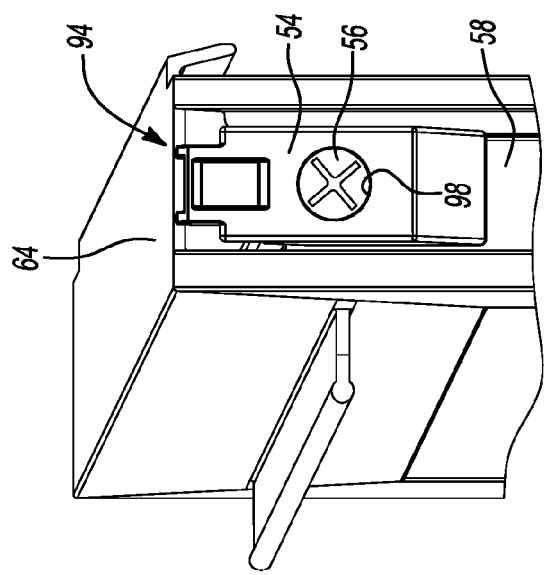
FIGS. 8A and 8B show perspective views of a receiver of the sash guide assembled on a window sash according to the principles of the present disclosure.
Figure 8B:
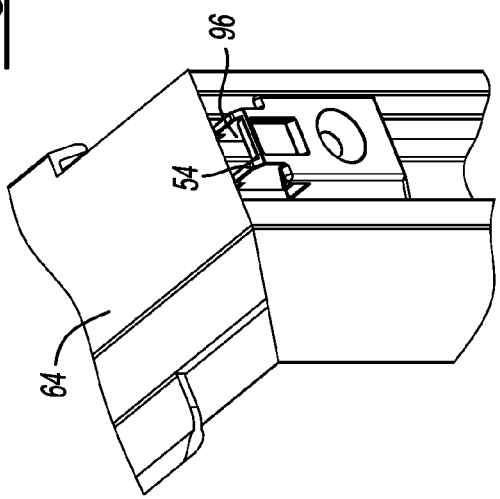

With further reference to FIGS. 6, 7A and 7B, the receiver 54 comprises a body 84 including a base portion 86 at a lower end 88 and two vertical, laterally spaced-apart sidewalls 90, and a front wall 92 extending upwardly from the base portion 86 to an upper end 94 of the receiver 54. The spaced-apart sidewalls 90 can oppose one another, and the sidewalls 90 and the front wall 92 can together create an inwardly facing channel 96, i.e., the channel 96 can open toward the vertical side rail 58 of the window sash 14. Intermediate the base portion 86 and the upper end 94 of the receiver 54 is a mounting aperture 98. Referring to FIGS. 6, 8A and 8B, the mounting aperture 98 can accommodate the fastener 56 for affixing the receiver 54 to the vertical rail 58 of the window sash 14. When affixed along a vertical centerline of the side rail 58 of a window sash 14, an inward side 100 of the base portion 86 of the receiver 54 can mount directly against the vertical side rail 58, and the upper end 94 of the receiver 54 can generally be flush with the top rail 64 of the window sash 14. As such, the channel 96 can be positioned at a known location relative to the vertical side rail 58 in preparation for assembly with the spacer 52.

As best seen in FIGS. 7A and 7B, an inward side 100 of the front wall 92 can form part of the channel 96 and can comprise a third ramped surface 102, a fourth ramped surface 104 and a fifth ramped surface 106. The third ramped surface 102 can serve as a lead-in guide surface to initially engage the first ramped surface 80 of the latch of the spacer during assembly of the spacer with the receiver 54, as will be described in greater detail below. The third ramped surface 102 can extend inwardly, i.e., toward the vertical side rail 58 of the window sash, and downwardly at a third angle. The third angle can be measured from a horizontal axis, as shown, e.g., in FIGS. 7A and 7B. The fourth ramped surface 104 can be located adjacent to and vertically below the third ramped surface 102. The fourth ramped surface 104 can also serve as a guide surface and can engage the projection portion 75 of the latch of the spacer during assembly and disassembly of the sash guide. The fourth ramped surface 104 can also extend inwardly and downwardly from the third ramped surface 102 at a fourth angle, as measured from a vertical axis as shown in FIGS. 7A and 7B. Included adjacent to a lower end of the fourth ramped surface 104 can be the fifth ramped surface 106. The fifth ramped surface 106 can form a ledge that can extend outwardly and downwardly from the fourth ramped surface 104 at a fifth angle, as measured from a horizontal axis.

As shown in FIGS. 7A and 7B, each of the third, fourth and fifth angles generally can be acute, and can vary depending on the requirements of the sash guide and/or its installation parameters, as will be discussed further herein. In one configuration, as shown in FIG. 7A, the third angle and the fifth angle can be substantially the same value and mirrored about the horizontal axis. In another configuration, as shown in FIG. 7B, the third angle and the fifth angle can be substantially different, with the third angle being greater than about 45 degrees and the fifth angle being less than about 45 degrees, and can be about 30 degrees. Also, as shown in the figures, the fourth angle can vary from about 0 degrees (e.g., FIG. 7A) to less than 45 degrees, and about 30 degrees (e.g., FIG. 7B).

Installation and removal of a sash guide 50 on the window sash 14 of a side load, hung window assembly can be understood with reference to FIGS. 8A, 8B, 9A and 9B. Installation can generally include a two-step procedure. Of course, while installation of a single sash guide is described herein, it is understood that two sash guides are included on each window sash, one sash guide included on each side of the window sash. In a first step, prior to loading the window sash 14 into the window frame 11, the receiver 54 can be affixed to a vertical side rail 58 of the window sash 14. As previously described, a fastener 56 can pass through the mounting aperture 98 of the receiver 54 and can be secured to the side rail 58 of the window sash 14 so as to attach the receiver 54 to the window sash 14. The receiver 54 is preferably affixed to the side rail 58 so that a longitudinal centerline of the receiver 54 is coincident with the vertical centerline of the side rail 58 (i.e., the receiver 54 is laterally centered on the side rail 58). Also, the receiver 54 is preferably mounted such that the upper end 94 of the receiver 54 is generally flush with the top rail 64 of the window sash 14. Once the receiver 54 is mounted to the window sash 14 it is adapted to accept the spacer 52.

After the receiver 54 is mounted to the window sash 14, the window sash 14 can be placed or "loaded" into the side-load window hung window assembly in a known manner.

Next, the spacer 52 of the sash guide 50 can be assembled with the receiver 54. As shown in FIG. 9A, the spacer 52 can be inserted and "snap-fit" into the receiver 54 in a vertically-downwardly direction. In this regard, the latch 74 is inserted into the channel 96 of the receiver 54. As the latch 74 is inserted, the lower, first ramped surface 80 of the projection 75 can engage the third ramped surface 102 of the channel 96 of the receiver 54 (i.e., at the inward side 100 of the front wall). Simultaneously, the lower wall 72 of the spacer 52 and the inwardly facing edges of the spacer side walls 66 can also engage the front wall 92 (i.e., at the outward side of the front wall 92) of the receiver 54.

Downward force applied against the cover portion 60 can result in a reaction force against the first ramped surface 80 that can cause the cantilevered latch 74 to bias or flex inwardly from a nominal position. As the latch 74 flexes inwardly, the projection 75 can pass over the third ramped surface 102. Further downward travel of the spacer then can cause the latch projection 75 to engage the fourth ramped surface 104. Continued downward force against the spacer 52 can cause a continued reaction force against the projection 75 and continued inward flexing of the latch 74. The projection 75 can then continue to ride along the fourth ramped surface 104. As insertion of the sash guide 50 continues under the downward force, the latch projection 75 can reach the fifth ramped surface 106 near the lower end of the channel 96. When the projection 75 passes the end of the fourth ramped surface 104, the outwardly and downwardly extending fifth ramped surface 106 no longer creates the reaction force against the projection that results in the inward flexing of the latch 74. Thus, the latch 74 can abruptly "snap back" to the nominal position where the upper, second ramped surface 82 of the projection 75 can seat against the fifth ramped surface 106 of the receiver 54. At the same time, the spacer 52 is fully inserted into the receiver 54 and the upper wall 60 of the spacer 52 can engage the top rail 64 of the window sash 14. Thus, full insertion of the spacer 52 into the receiver 54 allows the second ramped surface 82 on the projection 75 to correspondingly seat against the fifth ramped surface 106 on the receiver 54, and the upper wall 60 of the spacer 52 to seat against the top rail 64 of the window sash 14.

Removal of the sash guide 50 can generally be accomplished by reversing the steps for installation. As shown in FIG. 9B, though, disassembly of the spacer 52 from the receiver 54 can be initiated by an upward force on the spacer 52 (which, e.g., can be generated by prying the upper wall 60 of the receiver 54 upward and away from the top rail 64 of the window sash 14 with the flat tip of a screwdriver as shown in FIG. 9A).

It should be appreciated that during assembly and disassembly of the spacer 52 from the receiver 54, the engagement or interaction between the several ramped surfaces can be manipulated to require different downward and/or upward forces to accomplish the assembly and/or disassembly of the sash guide components. That is, it should be appreciated that the respective angles of the first ramped surface 80 and the third ramped surface 102 can influence a maximum downward insertion force on the spacer that is required to generate the reaction force needed to bias the latch 74 and enable the full downward insertion of the spacer 52 into the receiver 54 as described above. Similarly, the respective angles of the second ramped surface 82 and the fifth ramped surface 106 can influence a maximum upward separation force on the spacer 52 that is required to generate the reaction force needed to bias the latch 74 and enable the upward removal of the spacer from the receiver 54. Consequently, the various angles of the ramp surfaces can be refined to necessitate that the force required for installation of the spacer 52 into the receiver 54 is less than the force required to remove the spacer 52 from the receiver 54 or vice versa.

Operation of the sash guide 50 can be understood with reference to FIGS. 1 and 10. As shown in FIG. 1, the window balance assemblies 20 are disposed in the jamb channels 26 of the window frame 11. The uncurled end portion 120 of the curl spring 42 is affixed to the jamb wall 32 above the top rail 64 of the lower window sash 14 by a fastener 44, as shown in greater detail in FIG. 10. The sash guides 50 are installed on the window sash 14 and extend horizontally outwardly from the opposite sides of the window sash 14 and into the respective jamb channels 26, also seen clearly in FIGS. 2 and 10. As the lower sash 14 is moved vertically in the window frame 11 between a closed and an opened position, the sash guide 50 moves with the window sash 14. When the top rail 64 of the window sash passes the uncurled end portion 120 of the curl spring 42, the recess 68 in the spacer 52 of the sash guide 50 enables the sash guide 50 to pass by the fastener 44 without interference. The sash guides 50 improve the overall aesthetic and finished appearance of the side-load, hung window assembly 10. Moreover, with the sash guide 50 installed, the side-load window sash cannot be removed from the window frame 11 in the usual manner, until the spacer 52 of the sash guide 50 is removed.

FIGS. 11-17 show various alternative embodiments of a sash guide installation, some of which also include optional spring tail covers. With reference to FIGS. 11A, 11B, and 11C, a sash guide installation in a side-load, hung window assembly similar to that previously described further includes a spring tail cover 122 that further enhances the aesthetic, finished appearance of the window assembly. As seen in FIG. 11B, the spring tail cover 122 has an exterior surface 123 and provides an interior space 124 which, when installed, mounts over and encompasses the uncurled end portion 120 of the curl spring 42, including the head of the fastener 44 that affixes the curl spring 42 to the jamb wall 32. The spring tail cover 122 also includes a push-in-type mounting fastener 126 (e.g., a Christmas tree clip) projecting from an interior surface 128 of the spring tail cover 122. The spring tail cover 122 can be affixed to the jamb wall 32 with the mounting fastener 126 passing through a lower, second aperture 130 in the uncurled end portion 120 of the curl spring 42 (as best seen in FIG. 10) and into a corresponding and aligned aperture that can be formed in the jamb wall upon installation of the spring tail cover 122. As shown in the figures, the shape of the spring tail cover 122 can take various forms and still be suitable for its intended purpose. For example in FIG. 11C, the spring tail cover 132 has a box shape.

Figure 12:
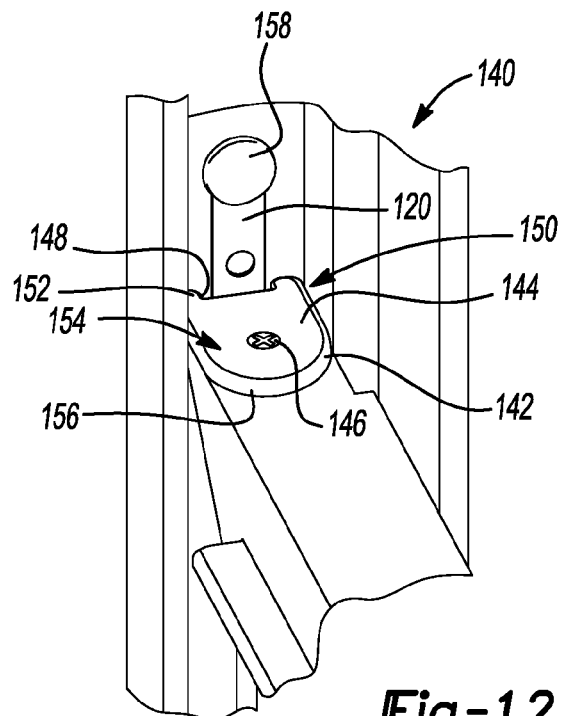
FIG. 12 illustrates an upper portion of a closed window sash with an alternate embodiment of a sash guide and an alternate embodiment of a spring tail cover according to the principles of the present disclosure.

Referring now to FIG. 12, an alternative sash guide installation is depicted. As shown in FIG. 12, a sash guide 140 that can serve as a trim piece to improve the finished appearance of the window assembly can comprise a spacer member 142 including a generally planar cover portion 144 that can be mounted directly to the top rail 64 of the window sash 14 by a threaded fastener or screw 146. An opening or recess 148 can be included at the outward end 150 of the sash guide 140 that can enable the sash guide 140 to clear the uncurled end portion 120 of the curl spring 42 and allow the sash guide 140 to pass by the mounting screw 44. One or more horizontal extension portions or fingers 152 can be formed on one side or on opposite sides of the recess 148. The sash guide 140 has an arcuate inner end 154 and can include a bevel 156 that further enhances the finished appearance of the window assembly. FIG. 12 shows the sash guide 140 in combination with a button-like spring tail cover 158 secured over the mounting screw 44. The spring tail cover 158 can, e.g., be snap-fit over a head of the mounting screw 44 in a well-known manner. The spring tail cover 158 further improves the aesthetic and finished appearance of the window assembly.

Figure 13A:
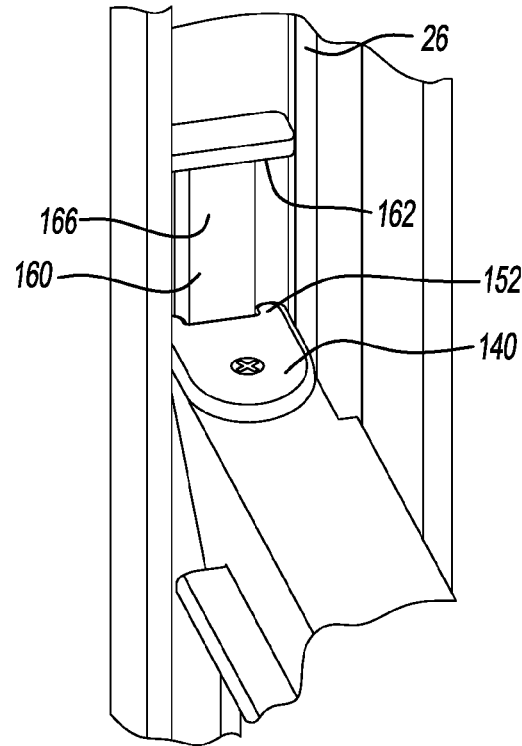
FIG. 13A shows the sash guide of FIG. 12 and another alternate embodiment of a spring tail cover according to the principles of the present disclosure.
Figure 13B:
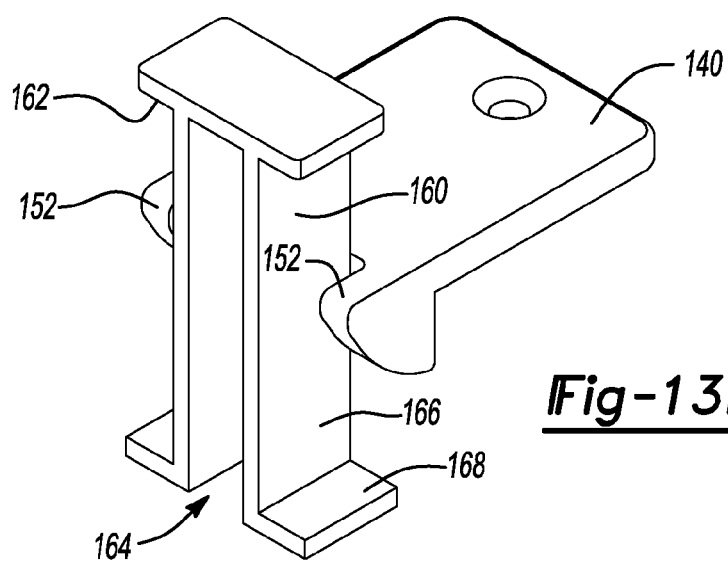
FIG. 13B shows a sash guide with still another alternate embodiment of a spring tail cover according to the principles of the present disclosure.

Also shown in FIGS. 13A and 13B is an alternative aesthetic spring tail cover 160 in combination with the sash guide similar to FIG. 12. The spring tail cover 160 can have a hollow, box-like configuration and can cover the uncurled end portion 120 of the curl spring 42 and the mounting screw 44. The spring tail cover 160 can be moveable within the jamb channel 26 as the window sash 14 moves vertically in the window frame 11. When the sash 14 is raised, the horizontal extension portions 152 of the sash guide 140 can engage a lipped edge 162 on a top of the spring tail cover 160 so as to carry the spring tail cover 160 vertically upwardly with the sash 14. An open end 164 at the bottom of the spring tail cover 160 (see, e.g., FIG. 13B) can enable the spring tail cover 160 to move freely over the uncurled end portion 120 of the curl spring 42 and the mounting screw 44. When the sash 14 is lowered, the spring tail cover 160 can move vertically downwardly by gravity. As shown in FIG. 13A, as the upper rail 64 of the sash 14 passes by the mounting screw 44 in the downward direction, the top of the spring tail cover 160 can engage the mounting screw 44 and cause the spring tail cover 160 to stop moving vertically downwardly. The sash 14, however, can continue its downward travel to the closed position and thereby expose a vertically extending body portion 166 of the spring tail cover 160. Also shown in FIG. 13B are optional tab portions 168 that can be included at the bottom of the spring tail cover 160. With the tab portions 168 included, the horizontal extension portions 152 of the sash guide 140 can engage the tab portions 168 and force the spring tail cover 160 vertically downwardly as the sash 14 moves, e.g., toward the closed position. This feature can enable the sash guide 140 to dislodge the spring tail cover 160 should it become stuck or is otherwise not able to move freely in the jamb channel 26.

Figure 14:
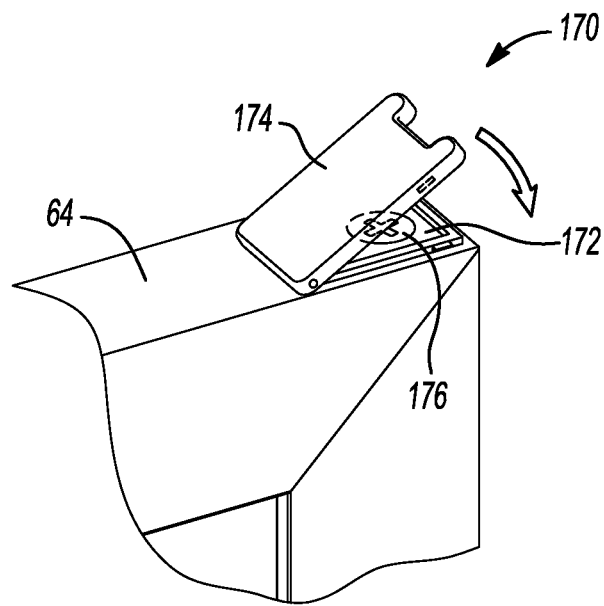
FIG. 14 shows still another embodiment of an alternate sash guide for a side load, hung window assembly according to the principles of the present disclosure.

FIG. 14 shows another alternate embodiment of a sash guide. The sash guide 170 can include a base portion 172 and a hinged cover portion 174. The base portion 172 can be secured to the upper rail 64 of the window sash 14, such as by a threaded fastener 176. The cover portion 174 can then be closed over and secured to the base portion 172 (e.g., with a "snap fit"), thereby covering or hiding the threaded fastener 176.

Figure 15:
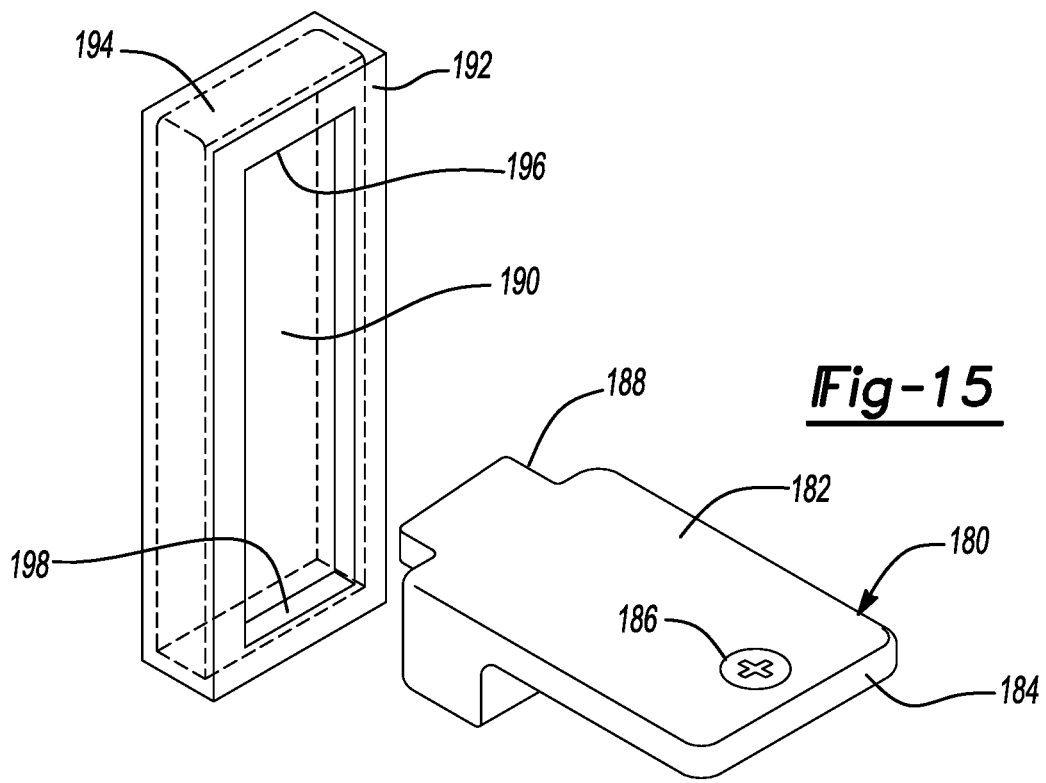
FIG. 15 illustrates still another embodiment of an alternate sash guide and spring cover for a side load, hung window assembly according to the principles of the present disclosure.

FIG. 15 shows yet an additional alternative sash guide and spring tail cover configurations. Similar to the sash guide installation of FIG. 13A, the sash guide 180 can comprise a spacer member 182 including a generally planar cover portion 184 that can be mounted directly to the top rail 64 of the window sash 14 by a threaded fastener or screw 186. However, the cover portion 184 of the sash guide 180 can include a horizontal tab 188 projecting outwardly toward the jamb channel 26. The tab 188 engages a corresponding slot 190 in an inward face 192 of a spring tail cover 194. When the sash 14 is raised, the horizontal tab 188 of the sash guide 180 can engage an upper edge 196 of the slot 190 of the spring tail cover 194 so as to carry the spring tail cover 194 vertically upwardly with the sash 14. When the sash 14 is lowered, the spring tail cover 194 can move vertically downwardly by gravity. If the spring tail cover 194 becomes stuck, then the tab 188 can engage a lower edge 198 of the slot 190 of the spring tail cover 194 so as to carry the spring tail cover 194 vertically downwardly with the sash 14. Alternatively, the slot 190 can be open ended at the lower end 198 of the spring tail cover 194 such that the tab 188 (and sash guide 180) can fully disengage from the spring tail cover 194.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sash guide assembly for a hung window having a window sash, a window jamb, and a window balance assembly, the sash guide assembly comprising:
    a spacer comprising:
        a cover portion having a horizontal upper wall, wherein a bottom surface of the horizontal upper wall contacts a top surface of an upper rail of the window sash in an installed configuration;
        a first vertical side wall and a second vertical sidewall, each of the first vertical side wall and the second vertical side wall extending vertically from the horizontal upper wall and disposed generally perpendicular to the horizontal upper wall, the first vertical side wall being substantially parallel to the second vertical side wall;
        a lower wall extending between the first vertical side wall and the second vertical side wall;
        a latch member extending from the bottom surface of the horizontal upper wall, the latch member comprising a projection portion disposed at a lower end of the latch member, the projection portion having a first ramped surface and a second ramped surface adjacent to the first ramped surface; and
        a recess defined by the horizontal upper wall, an inner surface of the first vertical side wall, and an inner surface of the second vertical side wall;
    a receiver comprising:
        a base portion;
        an upper portion;

a front wall extending between the base portion and the upper portion, the front wall having an inner surface comprising a third ramped surface, a fourth ramped surface adjacent to the third ramped surface, and a fifth ramped surface adjacent to the fourth ramped surface, wherein the fifth ramped surface engages the second ramped surface of the spacer, the fifth ramped surface being substantially parallel to the second ramped surface in the installed configuration;

a third vertical side wall and a fourth vertical side wall extending between the base portion and the upper portion, the third vertical side wall being substantially parallel to the fourth vertical side wall;

a channel defined by the inner surface of the front wall, an inner surface of the third vertical side wall, and an inner surface of the fourth vertical side wall; and an aperture extending between the inner surface of the front wall and an outer surface of the front wall; and a fastener engaging the aperture of the receiver and a side rail of the window sash, wherein the sash guide assembly is movable with the window sash with respect to the window jamb in the installed configuration, and wherein the recess of the spacer provides clearance for the sash guide assembly to pass over an uncurled end portion of a curl spring of the window balance assembly.

2. A sash guide assembly for a hung window having a window sash moveable within a window jamb of a window frame, the sash guide assembly comprising:

a spacer detachably connected to a receiver;

the spacer comprising:

a body portion having planar horizontal upper wall, wherein a bottom surface of the horizontal upper wall is located in close proximity to a top surface of an upper rail of the window sash and the sash guide assembly is movable with the window sash with respect to the window jamb in an installed configuration; and an outward end that extends at least partially into a gap defined by a side rail of the window sash and a jamb channel of the window jamb in the installed configuration;

the receiver comprising a base portion, an upper portion, and a front wall extending between the base portion and the upper portion, wherein the receiver is mounted to a side rail of the window sash; and wherein the spacer further comprises a latch member extending from the bottom surface of the horizontal upper wall, the latch member comprising a projection portion disposed at a lower end of the latch member that engages an inner surface of the front wall of the receiver to detachably connect the spacer to the receiver, wherein the spacer further comprises a recess defined by an outer surface of the outward end, wherein the recess provides clearance for the sash guide assembly to pass over an uncurled end portion of a curl spring of a window balance assembly, wherein the recess extends through the plane of the horizontal upper wall and the uncurled end portion of the curl spring extends through the recess of the spacer.

3. The sash guide assembly of claim 2, wherein the latch member is generally perpendicular to the bottom surface of the horizontal upper wall of the spacer.

4. The sash guide assembly of claim 2, wherein the latch member forms an angle of less than or equal to about forty-five (45) degrees with respect to a vertical axis.

5. The sash guide assembly of claim 2, wherein the latch member further comprises a first ramped surface having a first angle with respect to a horizontal axis and a second ramped surface adjacent to the first ramped surface, the second ramped surface having a second angle with respect to the horizontal axis, and wherein the inner surface of the front wall of the receiver comprises a third ramped surface having a third angle with respect to the horizontal axis, a fourth ramped surface adjacent to the third ramped surface, the fourth ramped surface having a fourth angle with respect to a vertical axis, and a fifth ramped surface adjacent to the fourth ramped surface, the fifth ramped surface having a fifth angle with respect to the horizontal axis, wherein the second ramped surface is substantially parallel to and engages the fifth ramped surface in the installed configuration.

6. The sash guide assembly of claim 5, wherein the first angle and the second angle have generally equal magnitudes and are mirrored about the horizontal axis, the third angle and the fifth angle have generally equal magnitudes and are mirrored about the horizontal axis, and the fourth angle is generally zero (0) degrees.

7. The sash guide assembly of claim 5, wherein each of the first angle, the second angle, the third angle, the fourth angle, and the fifth angle is acute.

8. The sash guide assembly of claim 5, wherein the first angle is greater than or equal to about forty-five (45) degrees and less than or equal to about ninety (90) degrees, the second angle is less than or equal to about forty-five (45) degrees, the third angle is greater than or equal to about forty-five (45) degrees, the fourth angle is less than or equal to about forty-five (45) degrees, and the fifth angle is less than or equal to about forty-five (45) degrees.

9. The sash guide assembly of claim 2, further comprising a spring tail cover, the spring tail cover having an interior space, wherein the uncurled end portion of the curl spring of the window balance assembly is at least partially disposed within the interior space, and wherein the spring tail cover is fixed with respect to the window jamb in the installed configuration.

10. The sash guide assembly of claim 2, further comprising a spring tail cover, the spring tail cover comprising an exterior surface, an interior surface defining an interior space and a mounting fastener projecting from the interior surface in a direction away from the exterior surface.

11. The sash guide assembly of claim 10, wherein the outward end of the spacer includes an outer surface defining the recess, wherein the recess provides clearance for the sash guide assembly to pass over the exterior surface of the spring tail cover.

12. The sash guide assembly of claim 2, further comprising a spring tail cover, the spring tail cover comprising an interior space, wherein the uncurled end portion of the curl spring of the window balance assembly for the window sash is at least partially disposed within the interior space.

13. A sash guide assembly for a hung window having a window sash moveable within a window jamb of a window frame, the sash guide assembly comprising:

a spacer comprising a body portion having a horizontal upper wall, wherein a bottom surface of the horizontal upper wall is located in close proximity to a top surface of an upper rail of the window sash and the sash guide assembly is movable with the window sash with respect to the window jamb in an installed configuration and an outer end that extends at least partially into a gap defined by a side rail of the window sash and a jamb channel of the window jamb in the installed configuration; and a receiver comprising a base portion, an upper portion, and a front wall extending between the base portion and the upper portion, wherein the receiver is mounted to a side rail of the window sash;

wherein the spacer further comprises a latch member extending from the bottom surface of the horizontal upper wall, the latch member comprising a projection portion disposed at a lower end of the latch member, and wherein the projection portion has a projection surface that engages an inner surface of the front wall of the receiver in the installed configuration; and wherein the projection surface of the latch member comprises a first ramped surface having a first angle with respect to a horizontal axis and a second ramped surface adjacent to the first ramped surface, the second ramped surface having a second angle with respect to the horizontal axis, and wherein the inner surface of the front wall of the receiver comprises a third ramped surface having a third angle with respect to the horizontal axis, a fourth ramped surface adjacent to the third ramped surface, the fourth ramped surface having a fourth angle with respect to a vertical axis, and a fifth ramped surface adjacent to the fourth ramped surface, the fifth ramped surface having a fifth angle with respect to the horizontal axis, wherein the second ramped surface is substantially parallel to and engages the fifth ramped surface in the installed configuration, wherein the first angle and the second angle have generally equal magnitudes and are mirrored about the horizontal axis, the third angle and the fifth angle have generally equal magnitudes and are mirrored about the horizontal axis, and the fourth angle is generally zero degrees.

14. The sash guide assembly of claim 13, wherein each of the first angle, the second angle, the third angle, the fourth angle, and the fifth angle is acute.

15. The sash guide assembly of claim 13, wherein the first angle is greater than or equal to about forty-five (45) degrees and less than or equal to about ninety (90) degrees, the second angle is less than or equal to about forty-five (45) degrees, the third angle is greater than or equal to about forty-five (45) degrees, the fourth angle is less than or equal to about forty-five (45) degrees, and the fifth angle is less than or equal to about forty-five (45) degrees.

16. The sash guide assembly of claim 13, further comprising a spring tail cover, the spring tail cover having an interior space, wherein an uncurled end portion of a curl spring of a window balance assembly is at least partially disposed within the interior space, and wherein the spring tail cover is fixed with respect to the window jamb in the installed configuration.

17. The sash guide assembly of claim 13, further comprising a spring tail cover, the spring tail cover comprising an exterior surface, an interior surface defining an interior space and a mounting fastener projecting from the interior surface in a direction away from the exterior surface.

18. The sash guide assembly of claim 17, wherein the outer end of the spacer includes an outer surface defining a recess, wherein the recess provides clearance for the sash guide assembly to pass over the exterior surface of the spring tail cover.

* * * * *

UNITED STATES PATENT AND TRADEMARK OFFICE
CERTIFICATE OF CORRECTION

PATENT NO. : 10,167,658 B2  
APPLICATION NO. : 15/263696  
DATED : September 13, 2016  
INVENTOR(S) : Richard S. deNormand Page 1 of 1

It is certified that error appears in the above-identified patent and that said Letters Patent is hereby corrected as shown below:

In the Claims

In Claim 2, Column 11, Line 33, after "having" insert --a--.

Signed and Sealed this
Fifth Day of March, 2019

Andrei Iancu
*Director of the United States Patent and Trademark Office*